May 27, 1952     E. D. FISHBURN     2,597,981
LAWN MOWER ATTACHMENT
Filed Dec. 12, 1949
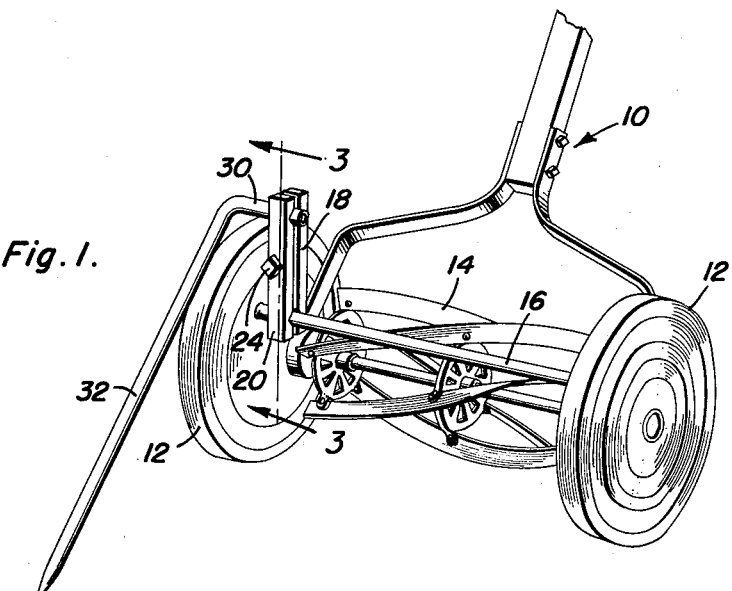
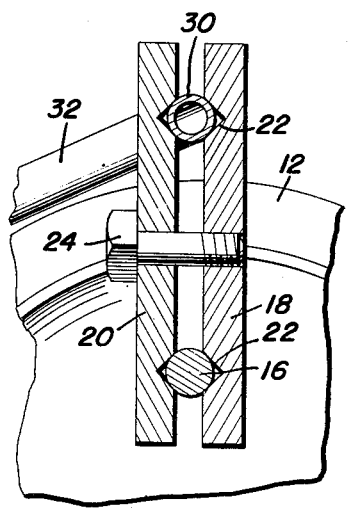
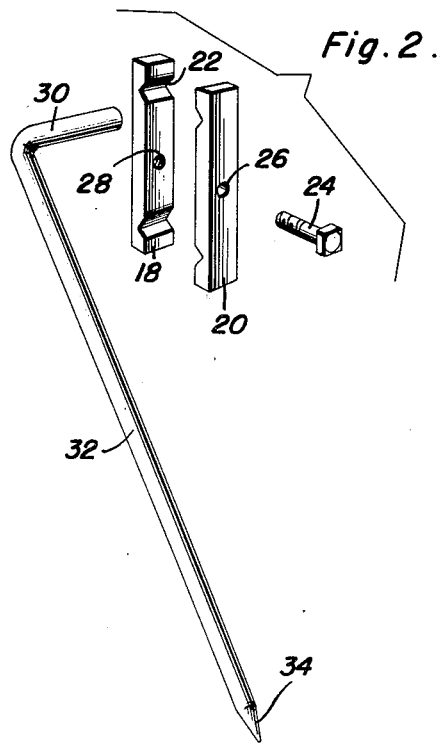
Inventor
Everett D. Fishburn Patented May 27, 1952

2,597,981

UNITED STATES PATENT OFFICE 2,597,981

LAWN MOWER ATTACHMENT

Everett D. Fishburn, Argos, Ind.

Application December 12, 1949, Serial No. 132,569

2 Claims. (Cl. 56—314)

This invention relates to new and useful improvements in lawn mowers, and more particularly pertains to an attachment for deflecting flowers and shrubs or the like from the path of the lawn mower.

The primary object of this invention is to deflect flowers, shrubs or the like from the path of a lawn mower, so as to avoid damage to either the vegetation or the mower and to lend greater ease to the operation of the lawn mower.

Another important object of this invention is to provide an attachment capable of realizing the foregoing object, that is, adjustable for attachment to various types of conventional lawn mowers or for particular uses or conditions with a given lawn mower.

Another object is to provide an attachment of this character of simple and practical construction, which is efficient and reliable in operation, relatively inexpensive to manufacture and otherwise well adapted for the purposes for which the same is intended.

A meritorious feature of this invention resides in the provision of a standard which may be adjustably positioned on a lawn mower brace rod and which adjustably engages the deflector.

Another feature of this invention resides in the fact that the attachment is reversible for use at either side of the lawn mower, and in which the deflector rod may be disposed in the path of one of the ground wheels or outside thereof.

These, together with various ancillary features and objects of the invention which will later become apparent as the following description proceeds, are attained by the present invention, a preferred embodiment of which has been illustrated by way of example only in the accompanying drawings, wherein:

Figure 1 is a perspective view showing the attachment in operative position on a conventional lawn mower, the handle of the lawn mower being broken away;

Figure 2 is an exploded perspective view of the attachment; and,

Figure 3 is an enlarged vertical sectional view of the attachment being taken upon the plane of the section line 3—3 of Figure 1.

Reference is now made more specifically to the accompanying drawings, wherein like numerals designate similar parts throughout the various views, and in which the numeral 10 designates a lawn mower of conventional construction having spaced ground wheels 12 and a rotary cutter 14 mounted therebetween. The lawn mower 10 conventionally includes a brace rod 16 disposed above and in advance of the rotary cutter 14, the opposite ends of which are fixedly secured to stationary parts of the lawn mower frame between the ground wheels 12.

The attachment, which constitutes the subject matter of this invention, is adapted to be adjustably secured to the brace rod 16 and comprises a pair of clamping bars 18 and 20 respectively, each of which is provided with a pair of parallel, transverse notches 22. A bolt 24 extends through an aperture 26 in the bar 20 and threadingly engages a threaded bore 28 in the bar 18.

An L-shaped deflector having right angled arms 30 and 32 is provided. The arms 30 and 32 are preferably at right angles to each other and are formed of tubular material with the arm 32 tapering to a point 34 at its outer end. As shown clearly in Figure 3, the notches 22 are opposed and define a pair of spaced, parallel recesses, which receive the brace rod 16 and the arm 30. The bolt 24 retains the bars 18 and 20 in clamping engagement with the brace rod 16 and the arm 30, while the parallel recesses formed by the notches 22 retain the brace rod 16 on the arm 30 in parallel relation.

The use of the attachment will be readily understood. As shown clearly in Figure 1, the bars 18 and 20 are secured at their lower end to the brace rod 16 and extend upwardly therefrom to a position above the adjacent ground wheel. The arm 30 extends over the adjacent ground wheel 12 while being parallel to the brace rod 16. The arm 32 extends forwardly and downwardly from the arm 30 so that the point 34 is spaced slightly above the ground. It will be appreciated that during forward travel of the lawn mower 10 the arm 32 will pass under low hanging vegetation which will slide upon the arm 32 and pass up and over the ground wheel 12 and the cutter 14.

The attachment disclosed herein possesses several noteworthy advantages. It is simple and inexpensive in construction, being formed entirely from four elementary parts. In addition, it is light in weight, it being noted that forming the deflector from tubular material produces a light weight construction that does not readily vibrate and is sufficiently stiff for the purposes desired. The primary advantage of the present invention resides in the extreme flexibility of the attachment and the ease with which it may be attached to a lawn mower while retaining the attachment in adjusted relation. It will be evident that the bars 18 and 20 may be longitudinally shifted or angularly adjusted on the brace rod 16, while the arm 30 is reversibly received between the bars 18 and 20 for use at either side of the lawn mower. The arm 30 is extensibly received between the bars 18 and 20 so as to dispose the arm 32 directly in the path of the ground wheel 12 or outside thereof, while being rotatably adjustable between the bars 18 and 20 to vary the elevation of the point 34 above the ground.

From the foregoing, the construction and operation of the invention will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modification and equivalents may be resorted to, falling within the scope of the appended claims.

Having described the invention, what is claimed as new is:

1. An attachment for a lawn mower of the type having a transverse brace rod carried between the ground wheels thereof, comprising a pair of parallel clamping bars, each of said bars having a pair of transverse, parallel notches at opposite ends thereof, the notches of said bars being opposed and defining a pair of spaced parallel clamping recesses between the bars, a bolt extending through one of said bars, between said recesses and threadingly engaging the other bar for urging the bars together, a substantially L-shaped integral deflector having first and second arms, said first arm being adjustably received through one of said recesses and clamped by said bars, said other recess for receiving a brace rod to be clamped by said bars, whereby said first arm may be disposed parallel to a brace rod with the second arm extending forwardly and downwardly from the lawn mower.

2. In combination with a lawn mower having a horizontal transverse brace rod disposed between the ground wheels thereof, a deflector comprising a standard carried by said brace rod and extending upwardly above said ground wheels, a first arm extending laterally from the upper end of said standard over one of said ground wheels, a second arm formed integral with and carried at the outer end of said first arm, said second arm extending downwardly and forwardly and terminating at a position spaced above the ground, said standard comprising a pair of clamping bars, each of said bars having a pair of transverse, parallel notches of said bars, said pairs of notches being opposed and defining a pair of parallel clamping recesses between the bars, a bolt disposed between said recesses and adjustably securing said bars together, one of said recesses receiving said brace rod and the other receiving said first arm.

EVERETT D. FISHBURN.

REFERENCES CITED

The following references are of record in the file of this patent:

UNITED STATES PATENTS

| Number | Name | Date |
|---|---|---|
| 281,311 | Snell | July 17, 1883 |
| 1,122,184 | Woodall | Dec. 22, 1914 |
| 1,135,071 | Swanson | Apr. 13, 1915 |
| 1,236,456 | Long | Aug. 14, 1917 |
| 1,626,712 | Agee | May 3, 1927 |
| 2,312,435 | Nelson | Mar. 21, 1943 |
| 2,485,312 | Powell | Oct. 18, 1949 |

FOREIGN PATENTS

| Number | Country | Date |
|---|---|---|
| 12,367 | Great Britain | Jan. 28, 1909 |